United States Patent Office 3,712,907
Patented Jan. 23, 1973

3,712,907
PROCESS FOR THE PRODUCTION OF SUBSTITUTED PHTHALIMIDO-N-CARBOXYLIC ACIDS
Heinrich Gilch and Ludwig Bottenbruch, Krefeld-Bockum, Wilfried Zecher, Cologne-Stammheim, and Rudolf Merten, Leverkusen, Germany, assignors to Farbenfabriken Bayer Aktiengesellschaft, Leverkusen, Germany
No Drawing. Filed May 7, 1969, Ser. No. 822,738
Claims priority, application Germany, May 15, 1968, P 17 70 416.4
Int. Cl. C07d 27/52
U.S. Cl. 260—326 A
6 Claims

ABSTRACT OF THE DISCLOSURE

Process for the production of substituted phthalimido-N-carboxylic acids by reaction of a lactam having more than 3 ring members with a phthalic acid anhydride derivative being substituted by an electrophilic substituent which is more electronegative than hydrogen.

The invention relates to a process for the production of phthalimido-N-carboxylic acids which are substituted with electrophilic groups by the reaction of substituted phthalic acid anhydrides and lactams.

It is known that phthalic anhydride and amino carboxylic acids react to form phthalimidocarboxylic acids, with water being split off in the process. If a lactam is used instead of the aminocarboxylic acid, the reaction proceeds slowly and considerable quantities of coloured by-products are formed.

It is an object of this invention to provide a process for the production of substituted phthalimido-N-carboxylic acids which avoids the disadvantages mentioned above.

This object is accomplished by a process for the production of substituted phthalimido-N-carboxylic acids which comprises reacting a lactam having more than 3 ring members with a phthalic anhydride derivative being substituted by an electrophilic substituent which is more electronegative than hydrogen, said reacting being carried out at a temperature of from 130 to 250° C.

The reaction may optionally be carried out in a solvent and also, if desired, in the presence of acid or basic catalysts.

The reaction of the lactams with the substituted phthalic anhydrides proceeds easily and smoothly if the substituents on the phthalic acid radical are electrophilic. This reaction is represented by the following general equation:

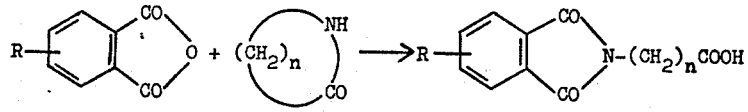

In this equation, the electrophilic radical R, which must be more electronegative than hydrogen, represents, for example, an $NO_2$, COOH, $SO_3M$, $SO_3H$ or Cl group, $n$ denotes an integer of from 2 to 12 and M represents an alkali metal. The following are examples of phthalic anhydrides which are substituted with electrophilic radicals: 3- and 4-nitrophthalic anhydride, trimellitic dianhydride, 3- and 4-phthalic anhydride sulfonate, pyromellitic dianhydride and chlorinated phthalic anhydrides such as tetrachlorophthalic anhydride. Trimellitic anhydride and phthalic anhydride sulfonic acid derivatives are particularly suitable. Instead of the cyclic dicarboxylic anhydrides, compounds may also be used which are converted into cyclic dicarboxylic anhydrides in the course of the reaction, e.g. the corresponding dicarboxylic acids. The process according to the invention may be carried out with lactams which have more than 3 ring members:

they may be substituted with alkyl, cycloalkyl and aryl groups. Examples of such lactams are dimethylacetidine, pyrrolidone, caprolactam and lauric lactam.

The reaction is carried out at temperatures of between 130 and 250° C., preferably between 150 and 210° C., either in solution or without solvents.

Suitable solvents in which the reaction of the lactams with the substituted phthalic anhydrides may be carried out are, for example, nitrobenzene, dimethylformamide, N-methylpyrrolidone, cresol, chlorobenzenes or dimethyl sulfoxide. The reaction may, if desired, be accelerated by using acid or basic catalysts. Organic compounds which have tertiary nitrogen atoms, e.g. imidazole, have proved to be very suitable for this purpose.

It is very surprising that the reaction between the phthalic anhydrides substituted with electrophilic substituents and the lactams proceeds so smoothly to give such excellent yields of phthalimido-N-carboxylic acids when the reaction of phthalic anhydride with caprolactam only provides moderate yields of product while substantial quantities of by-products are formed.

The products obtained are useful as starting materials for plasticisers and polymers.

The following examples are to further illustrate the invention without limiting it.

EXAMPLE 1

193 g. of 3-nitrophthalic anhydride and 113 g. of caprolactam are heated at 190° C. for 4 hours under nitrogen. The reaction product is recrystallized from methanol. M.P. 148–150° C. Yield 260 g. of 3-nitro-phthalimido-N-caproic acid.

$C_{14}H_{14}N_2O_6$ (306.3) calcd. (percent): C, 54.9; H, 4.6; N, 9.1; O, 31.4. Found (percent): C, 54.5; H, 4.5; N, 8.9; O, 31.3.

EXAMPLE 2

193 g. of 4-nitrophthalic anhydride and 113 g. of caprolactam are heated at 190° C. for 4 hours under nitrogen. The reaction product is recrystallised from methanol. M.P. 136–138° C. Yield 270 g. of 4-nitro-phthalimido-N-caproic acid.

$C_{14}H_{14}N_2O_6$ (306.3) calcd. (percent): C, 54.9; H, 4.6; N, 9.1; O, 31.4. Found (percent): C, 55.2; H, 4.7; N, 9.9; O, 31.7.

EXAMPLE 3

143 g. of tetrachlorophthalic anhydride and 56.5 g. of caprolactam are heated at 200° C. for 4 hours under nitrogen. The reaction product is recrystallised from dioxane. M.P. 228–230° C. Yield 180 g. of tetrachloro-phthalimido-N-caproic acid.

EXAMPLE 4

133 g. of phthalic anhydride-4-potassium sulfonate and 56.5 g. of caprolactam are heated at 200° C. for 7 hours. The reaction product is recrystallised from dilute hydrochloric acid. Yield 170 g. of phthalimido-N-caproic acid-4-sulfonic acid potassium.

$C_{14}H_{14}KNO_7S$ (341.3) calcd. (percent); C, 44.3; O, 29.6; S, 8.4; N, 3.7. Found (percent): C, 45.0; O, 30.1; S, 8.8; N, 3.7.

Acid number: Calcd: 148. Found: 151.

EXAMPLE 5

A melt of 566 g. of caprolactam and 960 g. of trimellitic anhydride is stirred for 4 hours at 200° C. Trimellitimidocaproic acid is obtained on cooling as a pale grey substance of melting point 195–198° C. Recrystallisation from glacial acetic acid yields 1440 g. (94% of the theorectical) of the pure, colurless compound, the melting point of which is 207–210° C.

$C_{15}H_{15}NO_6$ (305.3) calcd. (percent): C, 59.0; H, 5.0; N, 4.6. Found (percent): C, 59.1; H, 5.1; N, 4.4.

The imidocarboxylic acids can also be reacted to form esters by the usual processes with monofunctional and polyfunctional alcohols.

The reaction to form imidocarboxylic acid and the esterification may also be carried out in one step, as illustrated by the following example.

EXAMPLE 6

192 g. of trimellitic anhydride, 113 g. of caprolactam and 316 g. of isodecanol are slowly heated to 170° C. and then kept at this temperature for 10 hours. Water formed in the course of the reaction is removed at the same time over a distillation head. 158 g. of isodecanol are then added and esterification is continued for about 5 hours at 190° C. The reaction is completed by distilling off the excess isodecanol and the last remaining portions of water under vacuum. Trimellitimidocaproic acid bis-isodecyl ester remains behind as a slightly viscous liquid.

$C_{35}H_{55}NO_6$ (585.5) calcd.: N,2.4; Found: N, 2.6%.

EXAMPLE 7

226 g. of caprolactam and 218 g. of pyromellitic dianhydride are heated at 200° C. for 6 hours under nitrogen. Pyromellitimido-bis-caproic acid is obtained as a crystalline substance of melting point 239 to 241° C. by recrystallising the reaction mixture from pyridine.

$C_{22}H_{24}N_2O_8$ (444.5) calcd. (percent): C, 59.5; H, 5.4; N, 6.3. Found (percent): C, 59.6; H, 5.4; N, 6.5.

EXAMPLE 8

85 g. of pyrrolidone-(2) and 192 g. of trimellitic anhydride are stirred at 200° C. for 8 hours. When cold, the reaction mixture forms a hard, grey cake. Recrystallisation from a mixture of dimethylacetamide, acetic acid and water yields 235 g. (85% of the theoretical) of trimellitimido-butyric acid of M.P. 215–218° C.

$C_{13}H_{11}NO_6$ (277.2) calcd. (percent): C, 56.3; H, 4.0; N, 5.1. Found (percent): C, 56.3; H, 4.3; N, 5.2.

EXAMPLE 9

197 g. of dodecane lactam and 192 g. of trimellitic anhydride are heated at 200° C. under nitrogen for 6 hours. On cooling, the melt solidifies to a grey substance of melting point 158–161° C. 342 g. (88% of the theoretical) of pure trimellitimido-lauric acid of melting point 164–166° C. are obtained by recrystallisation from dioxane.

$C_{21}H_{27}NO_6$ (389.5) calcd. (percent): C, 64.8; H, 7.0; N, 3.6. Found (percent): C, 64.4; H, 7.2; N, 3.8.

What we claim is:

1. A process for the production of substituted pthalimido-N-carboxylic acids which comprises reacting a lactam having the formula

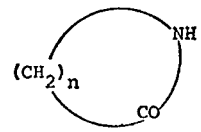

where $n$ is an integer from 2 to 12 with a member selected from the group consisting of phthalic anhydride and phthalic acid said member being substituted by an electrophilic substituent which is more electronegative than hydrogen, wherein said electrophilic substituent is a substituent selected from the group consisting of —$NO_2$, —COOH, —$SO_3M$, —$SO_3H$, —Cl, or

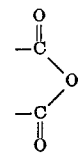

wherein M is an alkali metal, said reacting being carried out at a temperature of from 130 to 250° C.

2. The process of claim 1, said reacting being effected in an organic solvent.

3. The process of claim 1, said reacting being effected in the presence of an acid catalyst.

4. The process of claim 1, said reacting being effected in the presence of a basic catalyst.

5. The process of claim 4, said basic catalyst being an organic compound having a tertiary nitrogen atom.

6. The process of claim 5, said organic compound having a tertiary nitrogen atom being imidazole.

References Cited

Van der Want: Rec. Trav. Chim., 71:1012–16 (1952).

ALEX MAZEL, Primary Examiner

J. A. NARCAVAGE, Assistant Examiner

U.S. Cl. X.R.

260—326 S, 326 N